US010205715B2

(12) United States Patent
Joo (10) Patent No.: US 10,205,715 B2
(45) Date of Patent: Feb. 12, 2019

(54) SYSTEM AND METHOD OF PROVIDING PERSONAL CONTENT (71) Applicant: ELECTRONICS AND TELECOMMUNICATIONS RESEARCH INSTITUTE, Daejeon (KR)

(72) Inventor: Seong Soon Joo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 265 days.

(21) Appl. No.: 15/148,701

(22) Filed: May 6, 2016

(65) Prior Publication Data

US 2016/0330184 A1 Nov. 10, 2016

(30) Foreign Application Priority Data

May 7, 2015 (KR) .................. 10-2015-0063904
Jan. 5, 2016 (KR) .................. 10-2016-0000890

(51) Int. Cl.
G06F 7/04 (2006.01)
G06F 15/16 (2006.01)
G06F 17/30 (2006.01)
H04L 29/06 (2006.01)
H04L 29/08 (2006.01)
G06F 21/60 (2013.01)

(52) U.S. Cl.
CPC ............. H04L 63/08 (2013.01); G06F 21/60 (2013.01); H04L 67/02 (2013.01); H04L 67/306 (2013.01); H04L 67/327 (2013.01)

(58) Field of Classification Search
USPC ........................................... 726/3
See application file for complete search history.

(56) References Cited

U.S. PATENT DOCUMENTS

2004/0203638 A1* 10/2004 Chan ................... H04W 4/02
455/414.1
2012/0143691 A1 6/2012 Kim et al.
2012/0158775 A1 6/2012 Choi et al.
2012/0163237 A1* 6/2012 Joo ..................... H04L 41/0803
370/254

FOREIGN PATENT DOCUMENTS

KR 10-2007-0028014 A 3/2007
KR 10-1546875 B1 8/2015

* cited by examiner

*Primary Examiner* — Brandon S Hoffman
*Assistant Examiner* — Samuel Ambaye (57) ABSTRACT Provided is a personal content providing system for providing customized content according to a personalization context. The personal content providing system includes a context reader configured to receive a context beacon including the personalization context from one or more of a context terminal and a context tag, a content generation device configured to generate personal content, based on the personalization context, a content service device including a content output device that outputs the generated personal content, a local space switch configured to connect the context terminal, the context tag, the context reader, and the content service device which are disposed in a predetermined local space, and an infrastructure management device configured to manage the context terminal, the context tag, the context reader, and the content service device which are disposed in the predetermined local space.

15 Claims, 9 Drawing Sheets

SYSTEM AND METHOD OF PROVIDING PERSONAL CONTENT

CROSS-REFERENCE TO RELATED APPLICATIONS

This application claims priority under 35 U.S.C. § 119 to Korean Patent Application No. 10-2015-0063904, filed on May 7, 2015 and Korean Patent Application No. 10-2016-0000890, filed on Jan. 5, 2016, the disclosure of which is incorporated herein by reference in its entirety.

TECHNICAL FIELD

The present invention relates to a personal content providing system and method, and more particularly, to a personal content providing system and method, which provides customized content depending on a personalization context.

BACKGROUND

A personalization service denotes providing information and a service in consideration of the age and taste of a person. In the personalization service, a method has been the most widely known where the Internet web companies such as Amazon, Netflix, Google, and/or the like collect a purchase history of a customer, Internet search information, social network profile information, and/or the like to recommend the purchase of a product.

In order to provide the personalization service, personal information may be collected through an operation of agreeing to provide the personal information. Also, the personal information may be collected in a state where a person does not trace or check the personal information through the web beacon or cookie of a web browser.

Web service companies may share the collected information to estimate personal information. However, the collected information is protected on the assumption that the collected information is completely prevented from being leaked to the outside.

As described above, it is impossible to trace the use of personal information under control and management by a person, and moreover, a person who is to blame for leakage of personal information is not clear. For this reason, a problem where personal information is misused is further increasing.

Moreover, the personalization service is provided based on estimation information which is not under control by a person. However, it is difficult to provide a service at a level equal to an accurate personalization service based on information directly provided by a person.

Moreover, the personalization service is applied to only an online Internet service at present. As described above, in the personalization service, a space infrastructure which includes physical devices disposed in a certain space is not constructed in a space personalization service infrastructure form for providing the personalization service in response to a person.

Particularly, an infrastructure where content service devices in a space suitable for a condition of a person check the characteristic of the person on the basis of a place and a time to provide the personalization service at an appropriate time is not constructed.

In this context, Korean Patent Publication No. 10-2007-0028014 "method and system for providing webpage personalization service" discloses technology where a specific region of a webpage is set as a personalization region, and when a user accesses or logs in a server, the personalization region displays personal content information, which is frequently used by the user, such as weather, a calendar, an electronic calculator, a photograph, and/or the like.

SUMMARY

Accordingly, the present invention provides a personal content providing system and method, which generate multi-dimensional customized content suitable for a person, based on personalization context information provided by the person and provide the multi-dimensional customized content through an infrastructure device disposed in a local space.

The objects of the present invention are not limited to the aforesaid, but other objects not described herein will be clearly understood by those skilled in the art from descriptions below.

In one general aspect, a personal content providing system for providing customized content according to a personalization context includes: a context reader configured to receive a context beacon including the personalization context from one or more of a context terminal and a context tag; a content generation device configured to generate personal content, based on the personalization context; a content service device including a content output device that outputs the generated personal content; a local space switch configured to connect the context terminal, the context tag, the context reader, and the content service device which are disposed in a predetermined local space; and an infrastructure management device configured to manage the context terminal, the context tag, the context reader, and the content service device which are disposed in the predetermined local space.

In another general aspect, a personal content providing method performed by a personal content providing system includes: receiving a personalization context from a local space switch corresponding to a predetermined local space; requesting information of the predetermined local space and information of a content service device from an infrastructure management device; searching for content stored in a content storage device, based on information of the personalization context and the information of the predetermined local space; generating personal content to correspond to the content service device or a context terminal, based on found content; and transferring the generated personal content to the local space switch.

Other features and aspects will be apparent from the following detailed description, the drawings, and the claims.

DETAILED DESCRIPTION OF EMBODIMENTS

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. The present invention may, however, be embodied in many different forms and should not be construed as being limited to the embodiments set forth herein. In the accompanying drawings, a portion irrelevant to a description of the present invention will be omitted for clarity.

In this disclosure below, when it is described that one comprises (or includes or has) some elements, it should be understood that it may comprise (or include or has) only those elements, or it may comprise (or include or have) other elements as well as those elements if there is no specific limitation.

Hereinafter, a personal content providing system according to an embodiment of the present invention will be described with reference to FIGS. 1 to 6.

Figure 1:
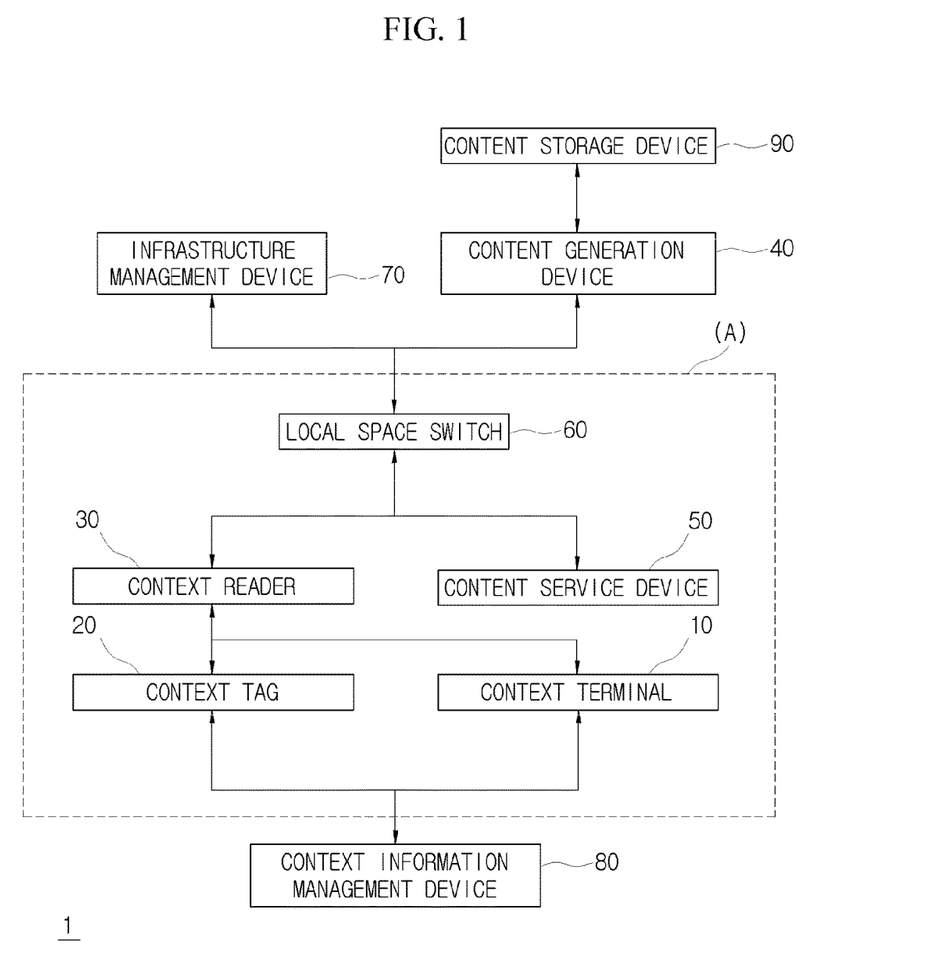
FIG. 1 is a block diagram of a personal content providing system according to an embodiment of the present invention.

FIG. 1 is a block diagram of a personal content providing system 1 according to an embodiment of the present invention.

Referring to FIG. 1, elements configuring the personal content providing system 1 may be connected to each other over a network. The network may denote a connection structure that enables information to be exchanged between nodes such as terminals and servers. Examples of the network may include a 3rd generation partnership project (3GPP) network, a long term evolution (LTE) network, a world interoperability for microwave access (WIMAX) network, Internet, a local area network (LAN), a wireless LAN, a wide area network (WAN), a personal area network (PAN), a Bluetooth network, a satellite broadcasting network, an analog broadcasting network, a digital multimedia broadcasting (DMB) network, etc., but are not limited thereto.

The personal content providing system 1 that provides customized content according to a personalization context may include a context reader 30, a content generation device 40, a content service device 50, a local space switch 60, and an infrastructure management device 70.

The context reader 30 may receive a context beacon including a personalization context from one or more of a context terminal 10 and a context tag 20. The context reader 30 may transmit the personalization context included in the received context beacon to the local space switch 60.

At this time, the context terminal 10 and the context tag 20 may each provide the personalization context to the infrastructure management device 70 according to an information grade.

The context terminal 10 may include all kinds of hand-held-based wireless communication devices such as a personal communication system (PCS), a global system for mobile communications (GSM), a personal digital cellular (PDC), a personal handyphone system (PHS), a personal digital assistant (PDA), international mobile telecommunication (IMT)-2000, code division multiple access (CDMA)-2000, W-code division multiple access (W-CDMA), a wireless broadband Internet (Wibro) terminal, etc. Also, the context terminal 10 may be a terminal such as a television, a set-top box, an IP camera, a computer, or the like.

The content generation device 40 may generate personal content, based on the personalization context. That is, the content generation device 40 may generate multi-dimensional customized content by using the available content service device 50, based on information of a local space A and personalization context information provided by the context terminal 10 or the context tag 20.

The content generation device 40 may transmit the generated content to the context terminal 10 as well as the content service device 50. Therefore, the context terminal 10 may output the generated personal content.

The content service device 50 may output the personal content generated by the content generation device 40. When the content generation device 40 generates the personal content, the content generation device 40 may transfer the personal content to the local space switch 60. Therefore, the content service device 50 may receive the personal content from the local space switch 60 and may output the received personal content.

In this case, the content service device 50 may further include a content output control device 55 that controls an output of the generated personal content.

The content service device 50 may be a physical device, and for example, may be one of devices, which operate based on control signal content, such as an illumination device, a hot-air blower, air conditioner, etc. Also, the content service device 50 may be one of devices that output audio, video, and text content, and moreover, may be one of devices that output four-dimensional (4D) content for controlling a tactile sense as well as a visual sense and an acoustic sense.

The local space switch 60 may connect the context terminal 10, the context tag 20, the context reader 30, and the content service device 50 which are disposed in a predetermined local space A. That is, the local space switch 60 may integratedly manage the context terminal 10, the context tag 20, the context reader 30, and the content service device 50 which are disposed in the predetermined local space A, and enables data to be exchanged between the devices disposed in the local space A.

The infrastructure management device 70 may manage the devices disposed in the local space A.

Hereinafter, the elements included in the personal content providing system 1 according to an embodiment of the present invention will be described in detail with reference to FIGS. 1 to 6.

Figure 2:
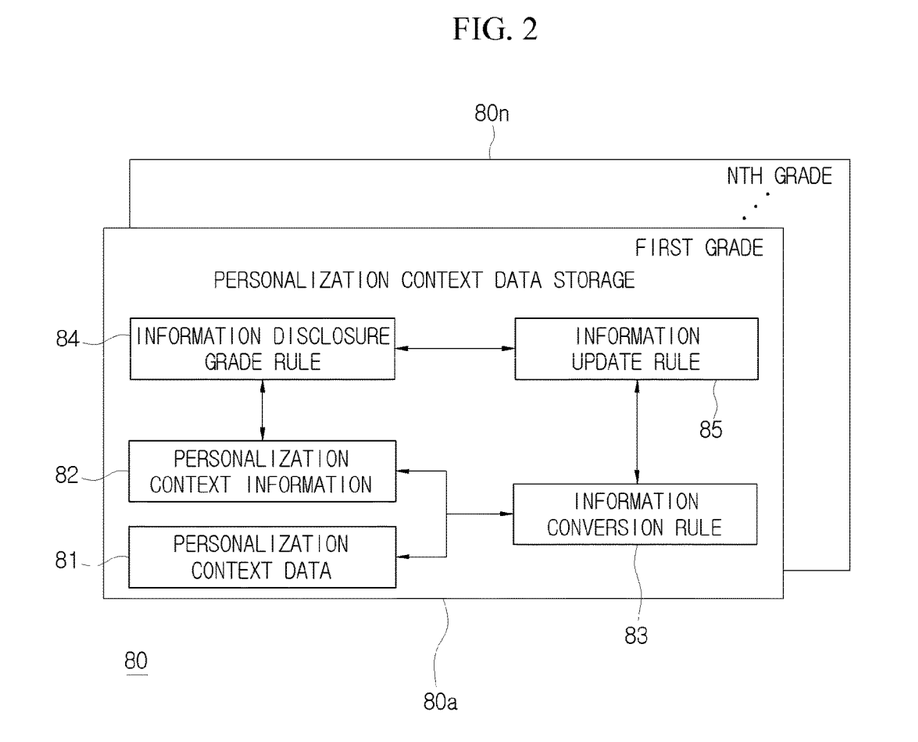
FIG. 2 is a block diagram for describing a function of a context information management device.

FIG. 2 is a block diagram for describing a function of the context information management device 80 that generates, stores, and updates personalization context corresponding to the predetermined local space A.

The personal content providing system 1 according to an embodiment of the present invention may further include the context information management device 80. The context information management device 80 may manage information of a personalization context corresponding to the predetermined local space A.

In detail, the context information management device 80 may include a plurality of personalization context data storages 80a to 80n. The personalization context data storages 80a to 80n may store personalization context data 81, an information conversion rule 83, and an information disclosure grade rule 84.

The personalization context data 81 may be configured in order for an expression range of a personalization context to be extended based on personal activity information. That is, the personalization context data 81 may be configured in order for the expression range of the personalization context to be continuously extended based on personal activity information that is obtained through a person's daily life in its life.

The information conversion rule 83 may be for generating personalization context information 82 from the personalization context data 81. Also, the information disclosure grade rule 84 may be for determining an information grade of a personalization context. In detail, based on the information disclosure grade rule 84, the information grade of the personalization context may be subdivided at a plurality of stages, an information disclosure process for each of the stages may be defined, and a disclosure grade of information about a combination of the personalization context data 81 may be determined.

The personalization context data storages 80a to 80n may be provided in plurality, and storage methods of the personalization context data storages 80a to 80n may be differently set based on a security grade of the personalization context data 81.

In addition, the context information management device 80 may update one or more of the personalization context data 81, the information conversion rule 83, and the information disclosure grade rule 84 periodically or whenever an update event occurs. That is, the context information management device 80 may add the personalization context data 81, update the personalization context information 82, disclose the information conversion rule 83, and update a security grade determination rule periodically or whenever an event for updating the personalization context information 82 occurs. To this end, each of the personalization context data storages 80a to 80n may further include an information update rule 85.

Next, the context terminal 10, the context tag 20, and the context reader 30 according to an embodiment of the present invention will be described with reference to FIG. 3.

Figure 3:
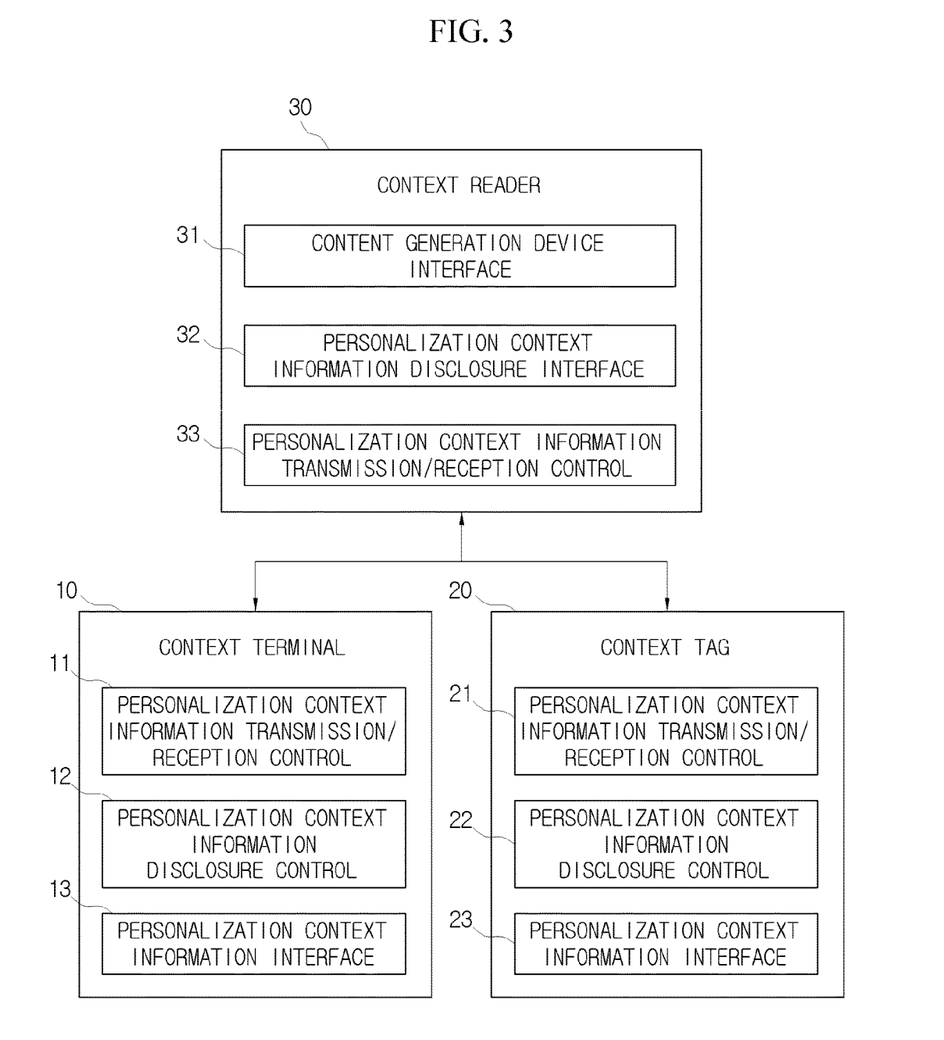
FIG. 3 is a block diagram for describing functions of a context terminal, a context tag, and a context reader.

FIG. 3 is a block diagram for describing functions of the context terminal 10, the context tag 20, and the context reader 30.

The context terminal 10 and the context tag 20 according to an embodiment of the present invention may provide personalization context information for providing a personalization service in the predetermined local space A. The context terminal 10 and the context tag 20 may respectively perform personalization context information transmission/reception control functions 11 and 21, personalization context information disclosure control functions 12 and 22, and personalization context information interface functions 13 and 23.

First, the context terminal 10 and the context tag 20 may perform the personalization context information disclosure control functions 12 and 22 of selecting personalization context information which is to be disclosed, based on a space and a condition. That is, the context terminal 10 and the context tag 20 may be provided with the personalization context information 82 and the information disclosure grade rule 84 from the context information management device 80 and may select personalization context information capable of being provided, based on the personalization context information 82 and the information disclosure grade rule 84.

Subsequently, the context terminal 10 and the context tag 20 may be provided with the personalization context information 82 and the information disclosure grade rule 84 from the context information management device 80 and may respectively perform the personalization context information interface functions 13 and 23 of transferring a history, where a personalization service is provided, to the context information management device 80.

Subsequently, the context terminal 10 and the context tag 20 may control an information disclosure process by grades for providing a personalization context and may respectively perform the personalization context information transmission/reception control functions 11 and 21 of controlling generation of a context beacon.

The context reader 30 according to an embodiment of the present invention may sense the context terminal 10 and the context tag 20 disposed in the predetermined local space A to collect personalization context information.

In detail, the context reader 30 may sense the context terminal 10 and the context tag 20 disposed in the predetermined local space A to receive a context beacon including personalization context information and may perform a personalization context information disclosure interface function 32 and a personalization context information transmission/reception control function 33 of controlling transmission/reception of personalization context information according to a grade-based information disclosure process. Therefore, the context reader 30 may provide personalization context information to the context service device 50 disposed in the local space A.

Moreover, the context reader 30 may provide a content generation device interface function 31 of connecting a user of a personalization service to the content generation device 40.

Figure 4:
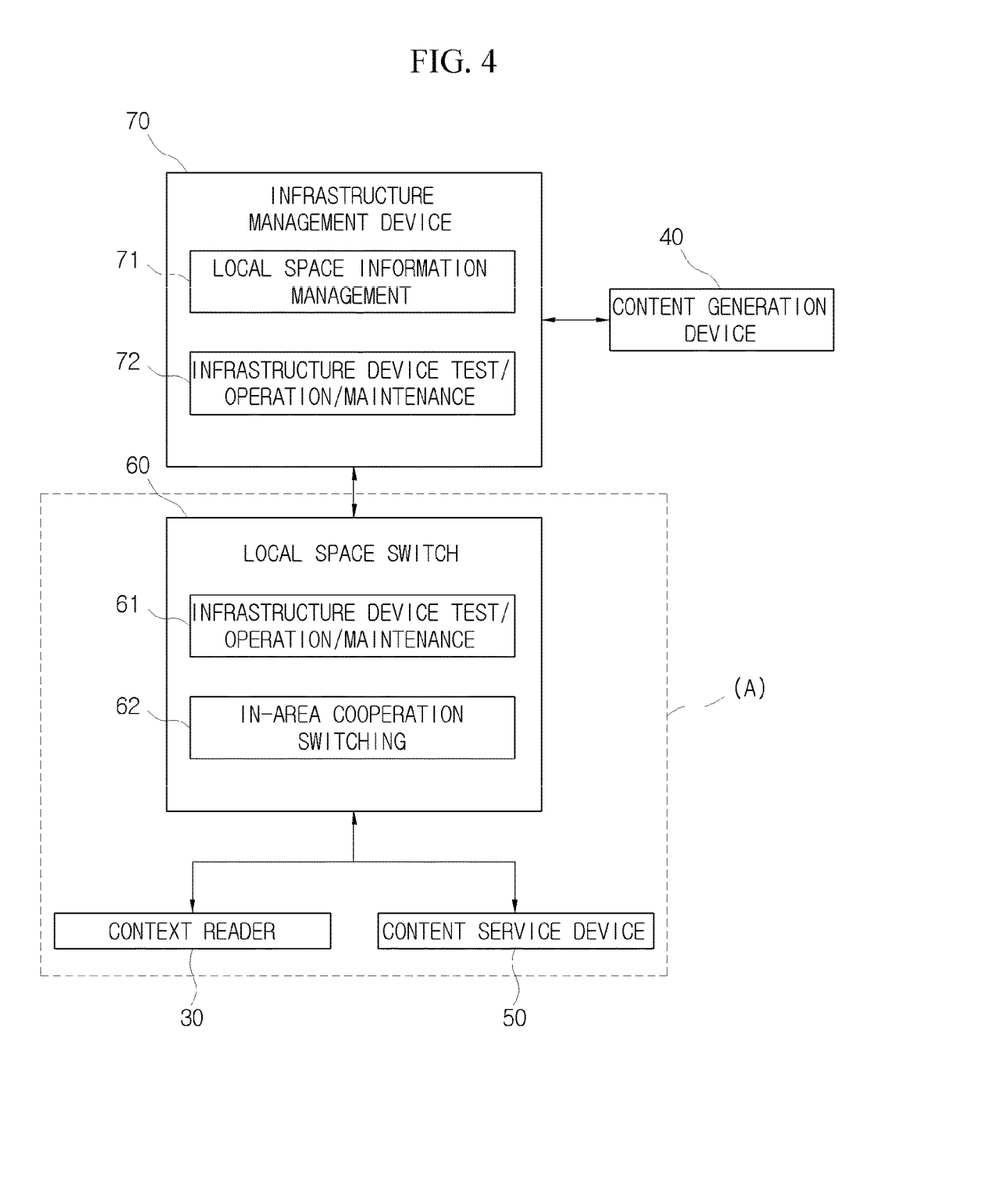
FIG. 4 is a block diagram for describing functions of a local space switch and an infrastructure management device.

FIG. 4 is a block diagram for describing functions of the local space switch 60 and the infrastructure management device 70.

According to an embodiment of the present invention, the local space switch 60 may connect devices disposed in the local space A.

In detail, the local space switch 60 may manage the context reader 30 and the content service device 50 which are disposed in the predetermined local space A. Also, the local space switch 60 may perform an infrastructure device test/operation/maintenance function 61 of supporting installation, test, state management, and maintenance of each of the devices disposed in the local space A according to control by the infrastructure management device 70.

Moreover, the local space switch 60 may perform an in-area cooperation switching function 62 of providing a communication function that connects the devices disposed in the local space A.

According to an embodiment of the present invention, the infrastructure management device 70 may perform a function 72 of testing, operating, and maintaining the devices disposed in the local space A by using the local space switch 60.

In detail, the infrastructure management device 70 may perform an infrastructure device test/operation/maintenance function 72 of controlling installation, test, state management, and maintenance of each of the devices disposed in the local space A.

Moreover, the infrastructure management device 70 may perform a local space information management function 72 of providing information of the local space A and configuration information of the content service device 50 to the content generation device 40.

Figure 5:
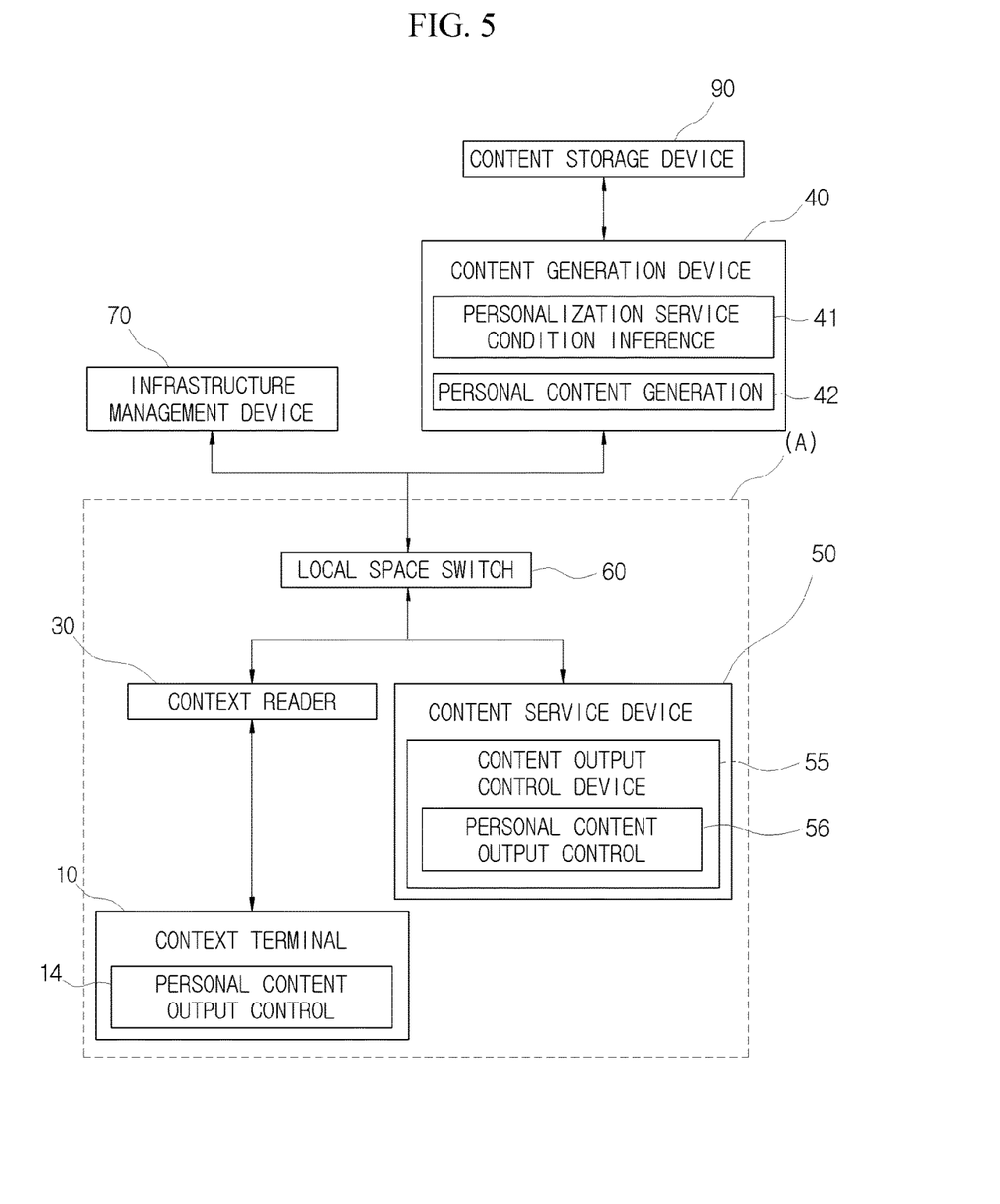
FIG. 5 is a block diagram for describing functions of a content generation device, a content service device, and a context terminal.

FIG. 5 is a block diagram for describing functions of the content generation device 40, the content service device 50 that outputs generated content, and the context terminal 20.

The personal content providing system 1 according to an embodiment of the present invention may further include a content storage device 90 that stores one or more pieces of content. Therefore, the content generation device 40 may receive content stored in the content storage device 90 to generate personal content, based on personalization context information.

In detail, the content generation device 40 may be provided with a personalization context from the context reader 30 disposed in the local space A and may be provided with information of the local space A and information of the content service device 50, which is disposed in the local space A, from the infrastructure management device 70 to perform a personalization service condition inference function 41 of inferring a personalization service condition.

Moreover, the content generation device 40 may perform a personal content generation function 42 that searches for the content stored in the content storage device 90, based on an inferred personalization service condition and a received personalization context and generates personal content to correspond to the content service device 50 or the context terminal 10, based on found content.

The content output control device 55 may be controlled by the content generation device 40 and may perform a personal content output control function 56 of outputting personal content generated by the content service device 50 that cooperates with the content output control device 55.

In addition, the context terminal 10 may be controlled by the content generation device 40 to perform a personal content output control function 14 of outputting personal content.

Figure 6:
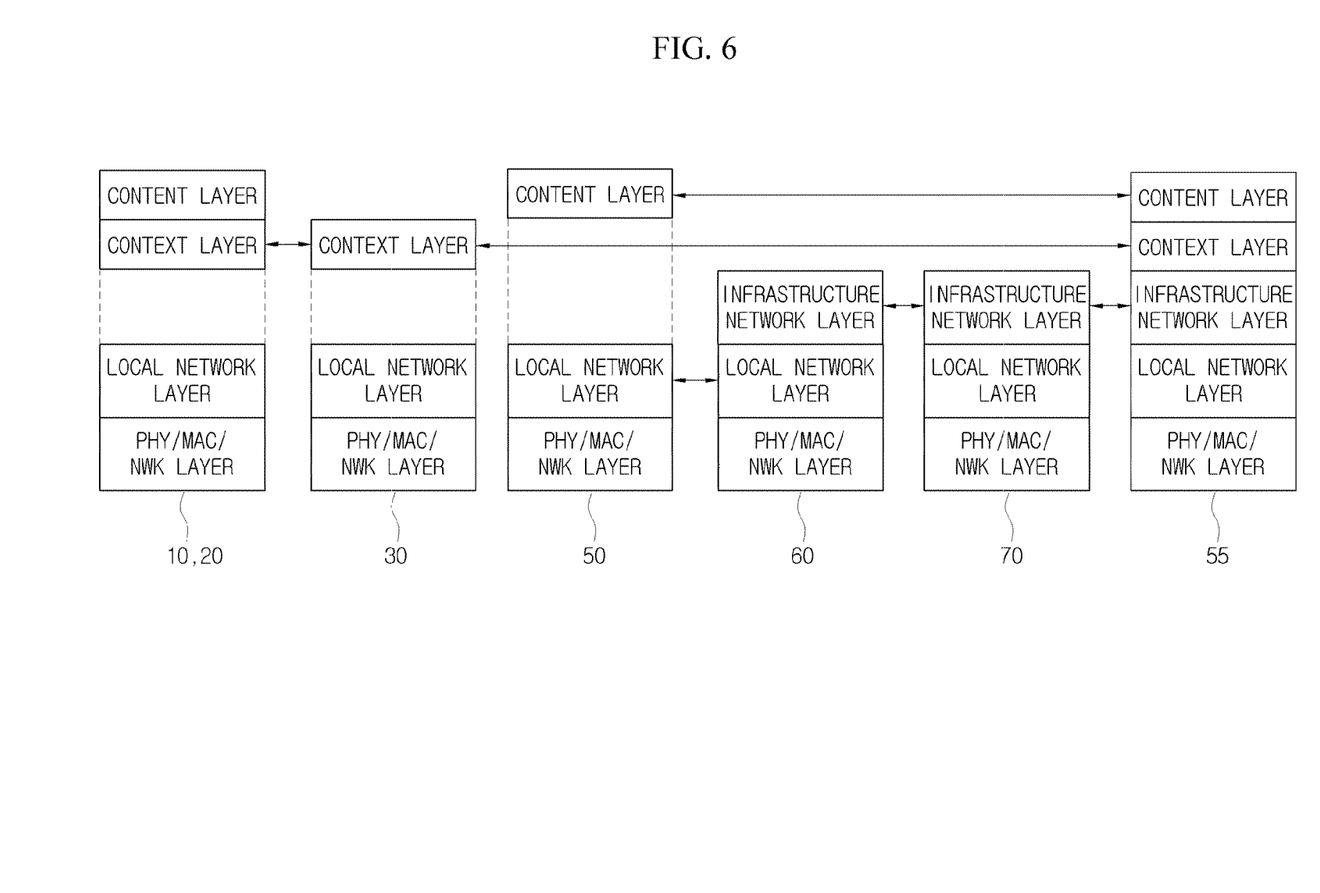
FIG. 6 is a diagram illustrating a hierarchy in a personal content providing system according to an embodiment of the present invention.

FIG. 6 is a diagram illustrating a hierarchy in the personal content providing system 1 according to an embodiment of the present invention.

The context terminal 10, the context tag 20, the context reader 30, and the content service device 50, the content output control device 55, the local space switch 60, and the infrastructure management device 70 included in the personal content providing system 1 according to an embodiment of the present invention may be configured with a PHY/MAC/NWK layer that selectively includes a low power communication protocol and a communication network provider access function, a local network layer for performing an integration cooperation switching function in the local space A, an infrastructure network layer that provides management of each of the devices disposed in the local space A, a context layer for exchanging personalization context information, and a content layer that controls distribution of personal content.

For reference, the elements according to an embodiment of the present invention illustrated in FIGS. 1 to 6 may each be implemented in the form of software or in the form of hardware such as a field programmable gate array (FPGA) or an application specific integrated circuit (ASIC) and may perform certain functions.

However, the elements are not limited to software or hardware in meaning. In other embodiments, each of the elements may be configured to be stored in a storage medium capable of being addressed, or may be configured to execute one or more processors.

Therefore, for example, the elements may include elements such as software elements, object-oriented software elements, class elements, and task elements, processes, functions, attributes, procedures, subroutines, segments of a program code, drivers, firmware, microcode, circuits, data, databases, data structures, tables, arrays, and variables.

Elements and a function provided in corresponding elements may be combined into fewer elements or may be further divided into additional elements.

Each of the elements of the personal content providing system 1 according to an embodiment of the present invention may include a communication module (not shown), a memory (not shown), and a processor (not shown).

In this case, the communication module may include a wired communication module and a wireless communication module. The wired communication module may be implemented with a power line communication device, a telephone line communication device, a cable home (MoCA), Ethernet, IEEE1294, an integration wired home network, an RS-485 control device, and/or the like. Also, the wireless communication module may be implemented with WLAN, Bluetooth, HDR WPAN, UWB, Zigbee, impulse radio, 60 GHz WPAN, binary-CDMA, wireless USB technology, wireless HDMI technology, and/or the like.

The memory may store programs for respectively operating the elements. Here, the memory may be a generic name for a volatile memory and a nonvolatile memory that continuously maintains stored information even when power is supplied thereto.

For example, examples of the memory may include NAND flash memory such as a compact flash (CF) card, a secure digital (SD) card, a memory stick, a solid state driver (SSD), and a micro SD card, a magnetic computer memory device such as a hard disk drive (HDD), and an optical disk drive such a CD-ROM and a DVD-ROM.

Moreover, the programs stored in the memory may each be implemented in the form of software or in the form of hardware such as an FPGA or an ASIC and may perform certain functions.

Hereinafter, a personal content providing method performed by the personal content providing system 1 according to an embodiment of the present invention will be described with reference to FIGS. 1 to 9.

Figure 7:
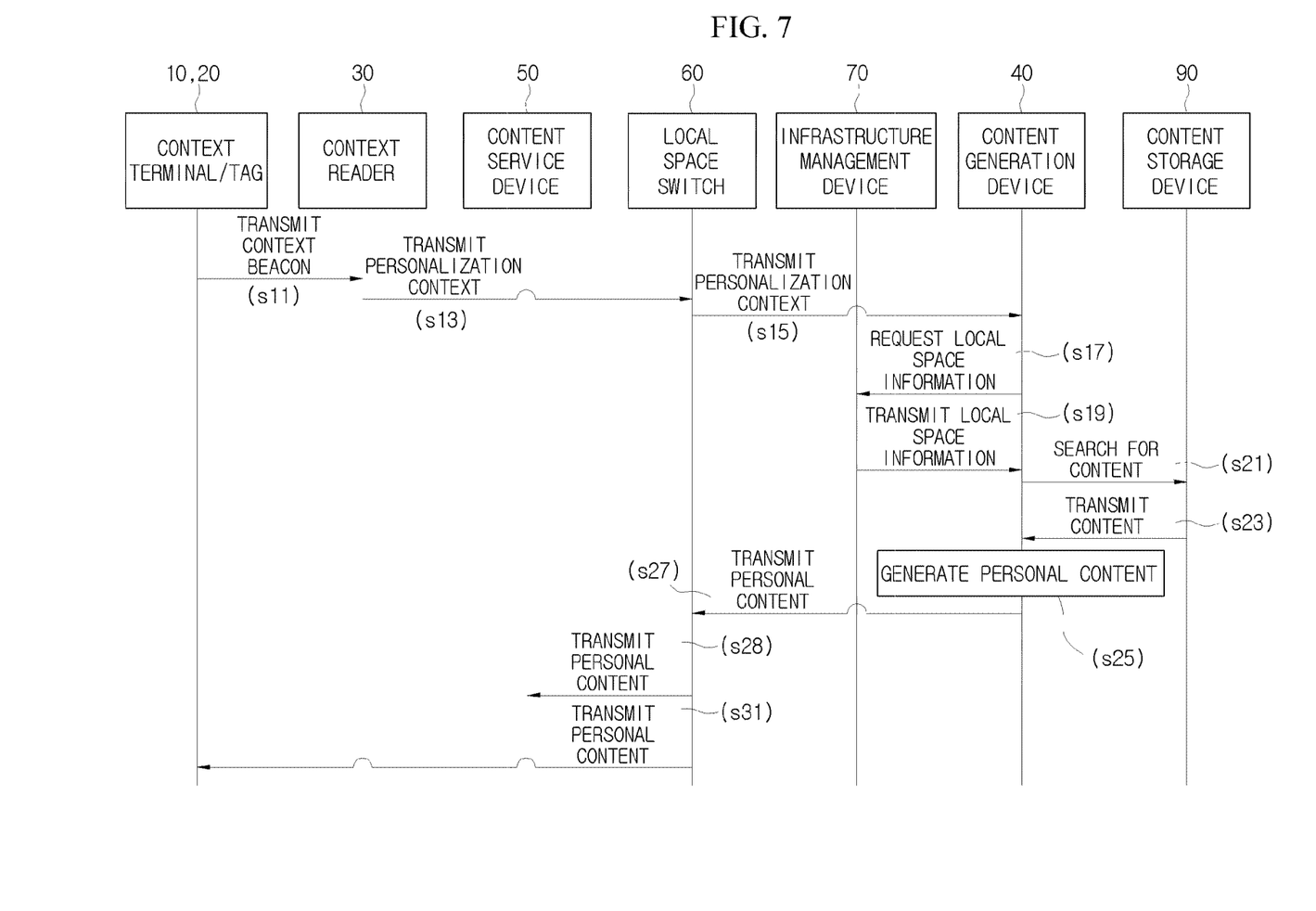
FIG. 7 is a flowchart of a personal content providing method according to an embodiment of the present invention.

FIG. 7 is a flowchart of a personal content providing method according to an embodiment of the present invention.

In the personal content providing method performed by the personal content providing system 1 according to an embodiment of the present invention, first, the context terminal 10 or the context tag 20 may transmit a context beacon including information of a personalization context to the context reader 30 in step S11. The context reader 30 may receive the context beacon and may transmit the information of the personalization context to the local space switch 60 in step S13, and the local space switch 60 may transmit the information of the personalization context to the content generation device 40 in step S15.

Subsequently, the content generation device 40 may request information of the local space A from the infrastructure management device 70 in step S17, and the infrastructure management device 70 may transmit the information of the local space A to the content generation device 40 in step S19. At this time, the content generation device 40 may request information of the content service device 50, disposed in the local space A, from the infrastructure management device 70 to receive the information of the content service device 50.

Subsequently, the content generation device 40 may search for content stored in the content storage device 90, based on the personalization context and the information of the local space A in step S21, and may receive found content in step S23. In this case, the content generation device 40 may infer a personalization service condition, based on the information of the local space A and the information of the content service device 50 and may search for the content stored in the content storage device 90, based on the inferred personalization service condition and the information of the personalization context.

Subsequently, the content generation device 40 may generate personal content from received content to correspond to the content service device 50 or the context terminal 10 in step S25, and may transfer the personal content to the local space switch 60 in step S27.

The local space switch 60 may transmit the generated personal content to one or more of the content service device 50 and the context terminal 10 in steps S29 and S31, and thus, the personal content may be output from the content service device 50 or the context terminal 10.

The personal content providing method performed by the personal content providing system 1 according to an embodiment of the present invention may perform a state management and maintenance process for each of devices disposed in each of local spaces. This will be described with reference to FIG. 8.

Figure 8:
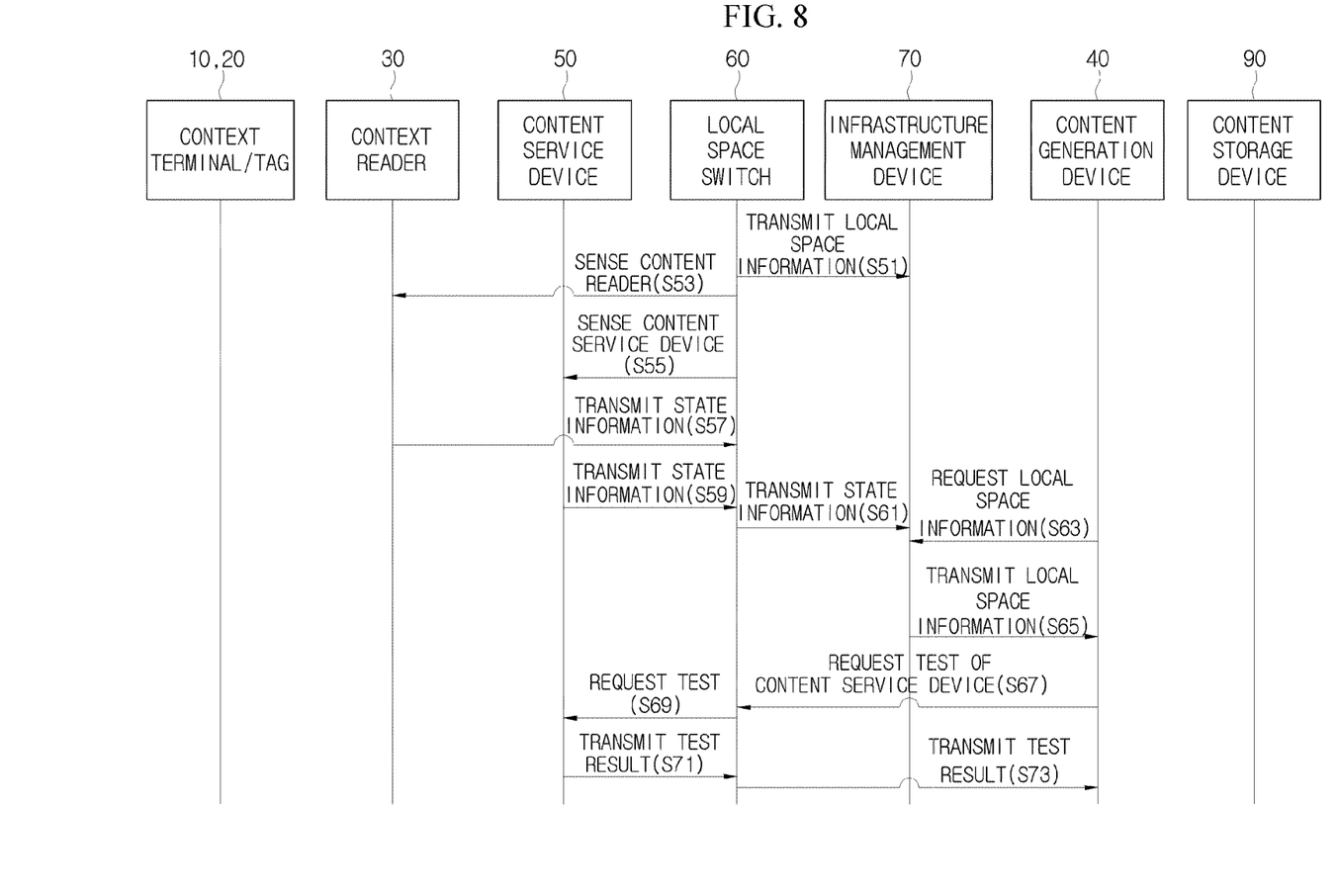
FIG. 8 is a flowchart for describing a state management and maintenance process for each of devices disposed in a local space in the personal content providing method according to an embodiment of the present invention.

FIG. 8 is a flowchart for describing a state management and maintenance process for each of devices disposed in a local space in the personal content providing method according to an embodiment of the present invention.

The local space switch 60 may periodically report state information of each of the devices, disposed in the local space A, to the infrastructure management device 70. To this end, first, the local space switch 60 may transmit information of the local space A to the infrastructure management device 70 in step S51, and may sense one or more of the context reader 30 and the content service device 50 disposed in the local space A in steps S53 and S55.

When state information of each of the content reader 30 and the content service device 50 is received from one or more of the content reader 30 and the content service device 50 in response to a result of the sensing in steps S57 and S59, the local space switch 60 may transmit the state information to the infrastructure management device 70 in step S61. Therefore, the infrastructure management device 70 may check state information of each of the devices disposed in the local space A and may manage or maintain the devices, based on the checked state information.

Moreover, the content generation device 40 may request the information of the local space A from the infrastructure management device 70 in step S63, and may receive the information of the local space A in step S65. Therefore, the content generation device 40 may request a test of the content service device 50 from the local space switch 60 in step S67, and the local space switch 60 may request the test from the content service device 50 in step S69, and may receive a result of the test in step S71. The content generation device 40 may receive the test result from the local space switch 60 in step S73, and thus may generate and provide personal content corresponding to the content service device 50 disposed in the local space A.

The personal content providing method according to an embodiment of the present invention may set a security link between the context terminal 10 or the context tag 20 and the local space switch 60 and may provide context information through a personal information use process and an authentication process. This will be described with reference to FIG. 9.

Figure 9:
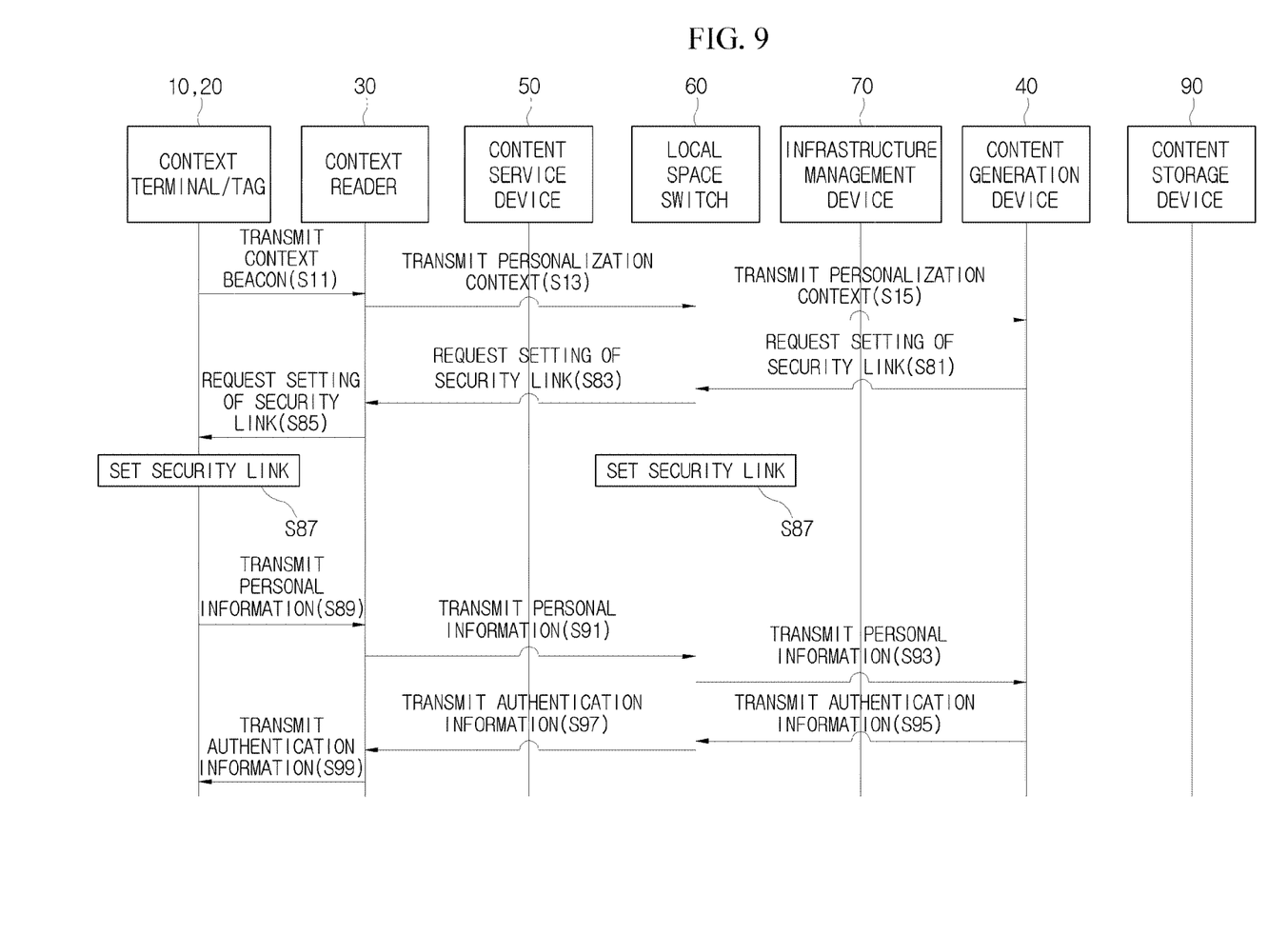
FIG. 9 is a flowchart for describing an authentication process in the personal content providing method according to an embodiment of the present invention.

FIG. 9 is a flowchart for describing an authentication process in the personal content providing method according to an embodiment of the present invention.

First, the context terminal 10 or the context tag 20 may transmit a context beacon including information of a personalization context to the context reader 30 in step S11. The context reader 30 may receive the context beacon and may transmit the information of the personalization context to the local space switch 60 in step S13, and the local space switch 60 may transmit the information of the personalization context to the content generation device 40 in step S15.

Subsequently, when the content generation device 40 may request a setting of a security link through the local space switch 60 in step S81, the local space switch 60 may transfer the request to the context reader 30 in step S83, and the context reader 30 may request the setting of the security link from the context tag 20 or the context terminal 10 in step S85. Through such a process, a security link may be set between the context tag 20 or the context terminal 10 and the local space switch 60 in step S87.

When the security link is set, the context terminal 10 or the context tag 20 may transmit personal information to the context reader 30 in step S89, the context reader 30 may receive the personal information to the local space switch 60 in step S91, and the content generation device 40 may receive the personal information in step S93.

The content generation device 40 may generate authentication information according to the personal information being received and may transmit the authentication information to the local space switch 60 in step S95, the local space switch 60 may transfer the authentication information to the context reader 30 in step S97, and the context terminal 10 or the context tag 20 may receive the authentication information in step S99. Through such an authentication process, the context terminal 10 or the context tag 20 prevents personal information from being misused and simultaneously provides a personalization context.

In the above description, steps S11 to S99 may be further divided into additional steps or may be combined into fewer steps. Also, some steps may be omitted depending on the case, and the order of steps may be changed. Furthermore, despite other omitted details, the details of the personal content providing system 1 described above with reference to FIGS. 1 to 6 may be applied to a bidirectional broadcast providing method illustrated in FIGS. 7 to 9.

Hereinafter, an example of a service to which the personal content providing system 1 and the personal content providing method according to an embodiment of the present invention are applied will be described.

For example, an A company that desires to advertise a no-charge product use promotion to women in their 20s and 30s may allow an advertisement to be exposed only when a woman in her 20s and 30s is located near an electronic display board installed at a public place, a subway station, a pedestrian underpass, a bus stop signage, and/or the like.

As another example, B desiring to purchase a specific product may be recommended a product suitable for the B among various products through content displayed by a display in a shop.

As another example, by using the personal content providing system 1 that notifies a walking direction and peripheral buildings and structures in vibration and voice, a blind person can safely walk without the help of another person.

As another example, C operating specific business may be provided with newly changed laws and matters to be observed among laws applied to the specific business by using content displayed by the personal content providing system 1.

As another example, D learning the specific field may be supplied with learn-related details by using content displayed by the personal content providing system 1.

As described above, according to the embodiments of the present invention, when a person is located in a specific local space, the person may be provided with personal content, in which information such as taste and/or the like of the person is accurately reflected, from a content service device in real time according to the clear requirement of the person.

Moreover, a content provider may provide high-quality personal content even without investing a separate resource for determining a preference of a user. Also, a provider which possesses and manages a space increases the use efficiency of a content service device in a local space.

Moreover, the incidence of leakage of personal information is minimized, and a persona may control and manage a disclosure degree of information and an application range of a personalization context.

The personal content providing method performed by the personal content providing system 1 according to the embodiments of the present invention may be implemented in the form of a storage medium that includes computer executable instructions, such as program modules, being executed by a computer. Computer-readable media may be any available media that may be accessed by the computer and includes both volatile and nonvolatile media, removable and non-removable media. In addition, the computer-readable media may include computer storage media and communication media. Computer storage media includes both the volatile and non-volatile, removable and non-removable media implemented as any method or technology for storage of information such as computer readable instructions, data structures, program modules, or other data. The medium of communication is a typically computer-readable instruction, and other data in a modulated data signal such as data structures, or program modules, or other transport mechanism and includes any information delivery media.

The method and system according to the embodiments of the present invention have been described in association with a specific embodiment, but their elements, some operations, or all operations may be implemented by using a computer system having general-use hardware architecture.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A personal content providing system for providing customized content according to a personalization context, the personal content providing system comprising:
   a context reader configured to receive a context beacon including the personalization context from one or more of a context terminal and a context tag;
   a content generation device configured to generate personal content, based on the personalization context;
   a content service device including a content output device that outputs the generated personal content;
   a local space switch configured to connect the context terminal, the context tag, the context reader, and the content service device which are disposed in a predetermined local space; and
   an infrastructure management device configured to manage the context terminal, the context tag, the context reader, and the content service device which are disposed in the predetermined local space,
   wherein the content generation device performs an authentication operation for generating the personal content,
   wherein when personal information transferred from the context tag is received from the local space switch, the content generation device transmits authentication information, which is to be transferred to the context tag, to the local space switch to perform the authentication operation, and
   wherein the content generation device receives through the local space switch the personalization context including the context beacon transferred from the context tag and requests a setting of a security link between the local space switch and the context tag, for performing the authentication operation.

2. The personal content providing system of claim 1, further comprising: a context information management device configured to manage information of a personalization context corresponding to the predetermined local space, wherein the context information management device further comprises a personalization context data storage configured to store personalization context data that is be configured for an expression range of the personalization context to be extended based on personal activity information, an information conversion rule for generating information of the personalization context from the personalization context data, and an information disclosure grade rule for determining an information grade of the personalization context.

3. The personal content providing system of claim 2, wherein the context information management device comprises a plurality of the personalization context data storages, and storage methods of the plurality of personalization context data storages are differently set based on a security grade of the personalization context data.

4. The personal content providing system of claim 2, wherein the context information management device updates one or more of the personalization context data, the information conversion rule, and the information disclosure grade rule periodically or whenever an update event occurs.

5. The personal content providing system of claim 2, wherein each of the context terminal and the context tag is provided with the information of the personalization context and the information disclosure grade rule from the context information management device, selects the information of the personalization context capable of being provided according to the information of the personalization context and the information disclosure grade rule, and controls generation of the context beacon, based on the selected information of the personalization context and the information disclosure grade rule.

6. The personal content providing system of claim 5, wherein the context reader senses the context terminal and the context tag disposed in the predetermined local space to receive the context beacon including the information of the personalization context, and provides the information of the personalization context to the content service device disposed in the predetermined local space.

7. The personal content providing system of claim 1, further comprising: a content storage device configured to store one or more pieces of content, wherein the content generation device receives the one or more pieces of content stored in the content storage device to generate the personal content, based on the information of the personalization context.

8. The personal content providing system of claim 7, wherein the content generation device receives the personalization context from the context reader, receives the information of the predetermined local space and information of the content service device to infer a personalization service condition, searches for the one or more pieces of content stored in the content storage device based on the inferred personalization service condition and the received personalization context, and generates the personal content to correspond to the content service device or the context terminal, based on found content.

9. The personal content providing system of claim 1, wherein the local space switch senses the context reader or the content service device corresponding to the predetermined local space to report state information of the context reader or the content service device to the infrastructure management device.

10. The personal content providing system of claim 9, wherein the content generation device requests a test of the content service device from the local space switch, based on information of the predetermined local space, and when the local space switch receives a result of the test for the content service device, the content generation device receives the test result.

11. A personal content providing method performed by a personal content providing system, the personal content providing method comprising:
   receiving a personalization context from a local space switch corresponding to a predetermined local space;
   requesting information of the predetermined local space and information of a content service device from an infrastructure management device;
   searching for content stored in a content storage device, based on information of the personalization context and the information of the predetermined local space;
   generating personal content to correspond to the content service device or a context terminal, based on found content; and
   before transmitting personal information, performing an authentication process,
   wherein when personal information transferred from a context tag is received from the local space switch,
   a content generation device transmits authentication information, which is to be transferred to the context tag, to the local space switch to perform the authentication operation, and
   wherein the personalization context includes a context beacon transferred from the context tag, and the content generation device requests setting a security link between the local space switch and the context tag, for performing the authentication operation.

12. The personal content providing method of claim 11, further comprising: when the personal content is received, by the local space switch, transferring the received personal content to the content service device or the context terminal; and outputting, by the content service device or the context terminal, the personal content.

13. The personal content providing method of claim 11, wherein the searching of the content comprises: inferring a personalization service condition, based on the information of the predetermined local space and the information of the content service device; and searching for the content stored in the content storage device based on the inferred personalization service condition and the personalization context.

14. The personal content providing method of claim 11, further comprising: sensing, by the local space switch, the context reader or the content service device corresponding to the predetermined local space to report state information of the context reader or the content service device to the infrastructure management device.

15. The personal content providing method of claim 14, further comprising: requesting a test of the content service device through the local space switch, based on the information of the predetermined local space; and when the local space switch receives a result of the test for the content service device, by the content generation device, receiving the test result.

* * * * *